3,740,199
ORE SEPARATION PROCESS

Adrian M. Gammill, Hendersonville, Thomas C. Runion, Sevierville, and William R. Householder, Johnson City, Tenn., assignors to Nuclear Fuel Services Inc., Wheaton, Md.
No Drawing. Continuation-in-part of application Ser. No. 666,506, Sept. 8, 1967. This application Apr. 7, 1971, Ser. No. 132,214
Int. Cl. C01f *1/00;* C01g *1/02;* C22b *51/00*
U.S. Cl. 423—10                             8 Claims

ABSTRACT OF THE DISCLOSURE

A process for the recovery of columbium, tantalum, molybdenum, uranium, the rare earths and thorium from euxenite ore using thermite reduction to convert the ore to a product where the uranium and rare earths in the slag can be readily leached from the slag with mineral acids. The other product recovered is a metal regulus containing a commercially useable ferro-columbium or ferro-tantalum product.

---

This application is a continuation-in-part of application Ser. No. 666,506 filed Sept. 8, 1967.

This invention relates to a method of processing euxenite ore, wherein the ore is mixed with a reactive metal and an oxidant. The charge is then ignited and a commercial quality ferro-columbium or ferro-tantalum metal is recovered. The uranium, rare earth and other values in the slag are leached from the slag with mineral acids.

Euxenite ore is a mixture of columbium, tantalum, uranium, yttrium, thorium and rare earth oxides which may also contain iron. The metal values cannot be recovered from these ores by a smelting process, nor can they be recovered by reduction of the oxide with hydrogen. In the most widely used prior art process, the ore is fused with caustic soda to convert the tantalum and columbium to sodium tantalate and sodium columbate, together with a number of impurities. The fused mass is cooled, crushed and the water soluble impurities removed by leaching with water. The acid-soluble impurities are then removed by treating the residue with hot hydrochloric acid. This converts the sodium tantalate and sodium columbate into insoluble tantalic and columbic acids. This mixture of acids is then dissolved in hot hydrofluoric acid and potassium carbonate is added to form the double salts, potassium tantalum fluoride and potassium columbium oxyfluoride. The hot solution is then cooled, the potassium tantalum fluoride crystallizes leaving the potassium columbium oxyfluoride in solution. The crystallized tantalum salt is separated from the solution, washed and dried, and the columbium salt is recovered from the solution. The pure tantalum and columbium metals are then recovered by an electrolysis technique.

We have found that euxenite ore can be processed and the values recovered more economically by a semi-reduction process. Very broadly, this process comprises thermite-reducing the ore to produce a metal regulus containing ferro-alloys of columbium and/or tantalum and a slag containing urania, yttria, thoria and rare earth.

The columbium and tantalum products are separated from the slag at this stage of the process and shipped without further processing. The slag is crushed, ground and the urania-thoria-yttria-rare earth values are leached with a solution of a strong mineral acid preferably 8 normal nitric acid containing approximately 0.03 molar hydrofluoric acid. Urania is separated from the filtrate by extraction with a tributyl phosphate, recovered from the solvent, denitrified and sold as $U_3O_8$. The thoria is separated from the yttria by H adjustment. The yttria rare earth values are separated from the solution by a carbonate precipitation.

One of the economic advantages of our process is the conversion of the columbium and tantalum to ferro-columbium and ferro-tantalum alloys that are marketed without additional processing.

The first step of our process comprises thermite reduction. Typically, euxenite ore containing the following approximate percentages of mineral values:

|  | Percent |
|---|---|
| Columbium | 18 |
| Tantalum | 3 |
| Uranium | 9 |
| Yttrium | 11 |
| Rare earth oxides | 19 |
| Thorium | 3 | and to which iron is added if not already present in sufficient amount, is treated with aluminum metal powder, an oxidant (such as $NaClO_3$, for example) and a small amount of magnesium powder is added. This reduction charge is weighed, blended and passed to a briquetting apparatus. The briquettes are then ignited by the addition of a small amount of metal powder or some other means of conveying heat to the mixture. The reduction reaction proceeds very rapidly and it is essentially complete in a matter of minutes.

The product recovered from this step is a mixture of ferro-columbium and ferro-tantalum alloys and a slag containing yttria, rare earth, urania and thoria values. The ferro-columbium and ferro-tantalum products are separated from the slag and marketed without further processing other than pickling, cleaning and separation of the particles according to size.

In the next step of the process, the slag is ground and leached with a solution of 8 normal nitric acid containing a small amount of hydrofluoric acid. After leaching, the mixture is filtered and the residue discarded. The filtrate contains the other mineral values, urania, yttria, thoria and the rare earths.

The urania is then separated from the acid solution by extraction with tributyl phosphate in a column. The tributyl phosphate containing the uranium is separated from the acid solution and the uranium is denitrated and $U_3O_8$ is recovered as the product.

In the next step of the process, the yttria and rare earth values are separated from the thorium values still present in the raffinate. In this step, the raffinate is adjusted to a pH of 3 or 4 by addition of anhydrous ammonia. Thorium hydroxide is precipitated and separated by filtration. If desired, the thorium can be separated from aluminum oxide and ferric oxide by conventional separation techniques.

The yttria-rare earth values are separated from the solution by precipitation with sodium carbonate. The precipitate is removed by filtering, and the filtrate dried, screened and packaged for commercial shipping.

The thermite reduction depends on the generation of a large amount of heat by addition of aluminum and other metals plus an oxidizing agent to the charge. Ferro alloys, such as ferro-vanadium, for example, have been prepared by thermite reduction in the well-known Goldschmidt process. The reactive metals used to form the thermite charge may be in the form of a powder, shavings, or turnings and may be any metal which will thermodynamically reduce columbium and tantalum but will not reduce rare earths or uranium. The preferred metals are aluminum and magnesium.

The amount of reactive metal added to the ore is controlled so that only the iron, columbium and tantalum are reduced. Satisfactory results are obtained when 12 to 16 weight percent is added. Iron may be added if necessary to prepare the ferro-columbium or ferro-tantalum alloys. In this case, sufficient iron is added to increase the iron level in the ferro-alloys to 25 percent iron, the balance being columbium and tantalum metals. The other metals, such as titanium, the rare earths, uranium and thorium will remain in this slag.

Any oxidant that is suitable for thermite reduction may be added. The preferred oxidants are the chlorates, sodium chlorate, potassium chlorate, sodium perchlorate, etc. The oxidant is typically 11 to 14 percent of the initial charge.

In the next step, the slag is separated from the metal alloys by conventional techniques. The slag is crushed and ground to suitable size for acid leaching and is leached with a strong mineral acid preferably 1 to 16 normal nitric acid that is up to 1/10 molar in hydrofluoric acid. The leaching is carried near the boiling point for a period of 2 to 12 hours, preferably about 3 hours (depending on particle size). The leached slag is filtered and the residue discarded. The filtrate contains the other metal values.

The urania is separated from the thoria, yttria, and rare earths by extraction with tributyl phosphate (TBP). The extraction is carried out using pure solvent since the filtrate contains sufficient nitric acid and aluminum nitrate to act as salting agents. The ratio of TBP to solution is maintained at 0.15 to 1 to 0.2 to 1. Tributyl phosphate is the preferred solvent for the extraction. However, other solvents such as tri-n-oxtyl phosphine oxide (TOPO), hexone, or ethyl ether, for example, may be used. The raffinate from the solvent extraction contains the yttria, rare earths and thoria.

The thoria is separated from this water layer by adjustment of the pH of the solution with ammonium hydroxide of any other suitable base to a pH of about 3 to 4. The thorium, aluminum and iron are separated as the hydroxides by filtration. If desired, the thorium may be recovered from the iron and aluminum using conventional techniques. The filtrate contains the yttria and rare earths which are separated by carbonate precipitation. The most economical and most attractive precipitating agent is sodium carbonate although other alkali metal carbonates may be used. The yttria and rare earth carbonates are separated by filtration, dried, screened, packaged and shipped.

Our invention is further illustrated by the following specific but non-limiting example.

EXAMPLE

This example illustrates the continuous process for the separation of the metal values from euxenite. A 4400 pound charge of the euxenite ore would contain the following quantities of metals:

| | Lb. |
|---|---|
| Columbium | 810 |
| Tantalum | 135 |
| Uranium oxide | 440 |
| Yttrium oxide | 480 |
| Rare earth oxides | 830 |
| Thorium oxide | 125 |

In a typical daily operation of the continuous process, 4440 pounds of the euxenite ore were mixed with 250 pounds of iron as iron oxide, 1006 pounds of aluminum powder, 880 pounds sodium per chlorate and 6 pounds of magnesium powder. The charge was weighed, blended and briquetted using standard techniques. The charge was reduced using magnesium powder as the starter and the metal columbium and tantalum recovered as the ferro-columbium and ferro-tantalum alloys.

The alloys were separated from the slag. In a typical run, 1320 pounds of ferro-columbium-tantalum containing 770 pounds of columbium and 125 pounds of tantalum were separated from the slag, crushed, packaged and shipped.

The slag containing 420 pounds of uranium oxide, 450 pounds yttrium oxide, 800 pounds of rare earth oxides, 120 pounds of thorium oxide was recovered, crushed, ground and leached with a solution made up of 4300 pounds of nitric acid, 28 pounds of hydrofluoric acid and 3600 pounds of water. The leaching was carried out near the boiling point of the mixed solution for a period of about 3 hours. The solution was cooled, filtered and the residue discarded. The filtrate contained approximately 50 grams per liter of uranium, 50 grams per liter of yttrium and 90 grams per liter of rare earth oxides.

The filtrate was extracted with tributyl phosphate in solvent extraction columns. Approximately 15% tributyl phosphate was used as a solvent to filtrate ratio of about 1.2 to 1. The solvent extraction was carried out at a temperature of about 25° C. The uranium was stripped from the tributyl phosphate, using a dilute nitric acid solution. The solution of uranium nitrate was boiled down to reduce the volume, denitrated, finally dried and shipped as $U_3O_8$.

The raffinate from the uranium extraction contained about 45 grams per liter of yttria and 82 grams per liter of rare earth oxides. Sufficient ammonium hydroxide was added to this solution to adjust the pH to 3. This removed the iron, thorium and aluminum together with some other impurities. The thoria and the impurities were removed by filtering and a filtrate consisting essentially of yttrium, mixed rare earth contaminated with a very small amount of thorium was recovered.

A total of 1800 gallons per day of this filtrate was treated with 1200 pounds per day of sodium carbonate. The carbonate was precipitated with 95 percent yield, and filtered and filter discarded. The filter cake was dried, screened, packaged and shipped as a mixed yttria rare earth carbonate. Approximately 1055 pounds of this product was recovered that contained 380 pounds of $Y_2O_3$ and 675 pounds of $Re_2O_3$.

Obviously many modifications and variations of the invention may be made without departing from the essence and scope thereof and only such limitations should be applied as are indicated in the appended claims.

What is claimed is:

1. The process of separating metal values from euxenite ore containing iron which comprises subjecting the ore to thermite reduction to form ferro-alloys of columbium and tantalum and a slag containing uranium, thorium, yttrium and the rare earth values, separating the ferro alloys of columbium and tantalum from the slag, leaching the slag with a strong mineral acid to solubilize the uranium, thorium, yttrium and rare earth values, separating the uranium from the other metal values by extraction, separating the thorium values from the yttrium and rare earth values and recovering the products from each stage of the process.

2. The process according to claim 1 wherein the ore, prior to said thermite reduction, is mixed with iron and with sufficient aluminum powder and sodium chlorate to reduce by said thermite reduction substantially only the iron, columbium and tantalum values present to form said ferro-columbium and ferro-tantalum alloys.

3. The process according to claim 1 wherein the slag is leached with a 4 to 16 molar nitric acid solution containing 0.02 to 0.05 mole of hydrofluoric acid per liter, at a temperature of about 90 to 100° F. for about 2 to 12 hours.

4. The process according to claim 1 wherein the urania is separated from the acid leach liquor by extraction with tributyl phosphate, the urania is separated from the solvent fraction, concentrated, denitrated and converted to the oxide.

5. The process according to claim 4 wherein the ratio of tributyl phosphate to acid leach liquor is maintained between 0.15 to 1 and 0.20 to 1.

6. The process according to claim 1 wherein the thoria is separated from the yttria and rare earth values by adjusting the urania free acid leach liquor to a pH of about 3 to 4 with ammonia, filtering and recovering a thoria rich fraction.

7. The process according to claim 1 wherein the yttria and rare earth values are recovered by adding alkali metal carbonate as a solid to the thoria and urania free acid leach liquor, filtering, drying, recovering a yttria-rare earth oxide product.

8. The process according to claim 7 wherein the alkali metal carbonate is sodium carbonate and a sufficient quantity is added to adjust the pH to about 9 or 10.

References Cited
UNITED STATES PATENTS

| | | | |
|---|---|---|---|
| 2,956,857 | 10/1960 | Ruhoff et al. | 23—321 X |
| 2,992,095 | 7/1961 | Choi Li | 75—27 X |
| 3,111,375 | 11/1963 | Gottdenker et al. | 23—328 |
| 3,154,408 | 10/1964 | Knighton et al. | 75—84.1 |
| 3,184,302 | 5/1965 | Chindgren | 75—27 X |
| 3,232,749 | 2/1966 | Yutema | 75—27 X |
| 3,347,642 | 10/1967 | Thomas et al. | 23—321 |
| 3,360,346 | 12/1967 | Huet et al. | 23—341 |

OTHER REFERENCES

Clegg et al.: "Uranium Ore Processing," pp. 90, 91, 98, 99, Addison-Wesley Publishing Company, Inc. (1958), Reading Mass.

BENJAMIN R. PADGETT, Primary Examiner

E. A. MILLER, Assistant Examiner

U.S. Cl. X.R.

423—20; 75—27, 84, 84.1 R